United States Patent
Miller et al.

(10) Patent No.: US 9,840,230 B2
(45) Date of Patent: Dec. 12, 2017

(54) APPARATUS AND METHOD FOR CONTROLLING A RESTRICTED MODE IN A VEHICLE

(75) Inventors: Thomas Lee Miller, Ann Arbor, MI (US); Brian Bennie, Sterling Heights, MI (US); Eric L. Reed, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1394 days.

(21) Appl. No.: 13/405,679

(22) Filed: Feb. 27, 2012

(65) Prior Publication Data

US 2013/0226399 A1  Aug. 29, 2013

(51) Int. Cl.
| | |
|---|---|
| *E05B 65/20* | (2006.01) |
| *B60R 25/20* | (2013.01) |
| *B60W 50/00* | (2006.01) |
| *B60W 50/08* | (2012.01) |

(52) U.S. Cl.
CPC ......... *B60R 25/20* (2013.01); *B60W 50/0098* (2013.01); *B60W 50/085* (2013.01); *B60W 2050/0082* (2013.01); *B60W 2540/28* (2013.01)

(58) Field of Classification Search
CPC . B60R 25/20; B60W 50/0098; B60W 50/085; B60W 2540/28; B60W 2050/0082
See application file for complete search history.

(56) References Cited

U.S. PATENT DOCUMENTS

| | | | |
|---|---|---|---|
| 5,467,070 A * | 11/1995 | Drori et al. | 340/426.36 |
| 5,513,105 A * | 4/1996 | Krones | 701/48 |
| 5,513,107 A | 4/1996 | Gormley | |
| 5,519,255 A * | 5/1996 | Burtch et al. | 307/10.2 |
| 5,635,916 A | 6/1997 | Bucholtz et al. | |
| 6,018,291 A | 1/2000 | Marble et al. | |
| 7,075,409 B2 | 7/2006 | Guba | |
| 7,148,790 B2 * | 12/2006 | Aoyama et al. | 340/425.5 |
| 8,330,571 B2 * | 12/2012 | Yamaguchi et al. | 340/5.61 |
| 2004/0046452 A1 | 3/2004 | Suyama et al. | |
| 2004/0227642 A1 * | 11/2004 | Giles et al. | 340/825.72 |
| 2005/0125110 A1 | 6/2005 | Potter et al. | |
| 2005/0134115 A1 | 6/2005 | Betts, Jr. et al. | |
| 2005/0190039 A1 | 9/2005 | Aoyama et al. | |
| 2005/0261816 A1 | 11/2005 | DiCroce et al. | |
| 2007/0100514 A1 | 5/2007 | Park | |

FOREIGN PATENT DOCUMENTS

| | | |
|---|---|---|
| CN | 101725286 A | 6/2010 |
| WO | 0125572 A1 | 4/2001 |

OTHER PUBLICATIONS

Chinese Office Action for corresponding Application No. 201310057405.4, dated Feb. 3, 2016, 7 pages.

* cited by examiner

*Primary Examiner* — Kimberly S Berona
*Assistant Examiner* — Alan D Hutchinson
(74) *Attorney, Agent, or Firm* — Brooks Kushman P.C.; Jennifer M. Stec (57) ABSTRACT

An apparatus for controlling a restricted mode is provided. The apparatus includes a controller that is configured to receive a first input from a primary driver corresponding to a request to change a vehicle from a fully operational mode to a restricted mode for a secondary driver. The controller is further configured to initiate a first timer for preventing the vehicle from exiting from the restricted mode to the fully operational mode if an occupant communication device belonging to the primary driver is detected by the vehicle prior to the first timer expiring.

10 Claims, 7 Drawing Sheets

APPARATUS AND METHOD FOR CONTROLLING A RESTRICTED MODE IN A VEHICLE

TECHNICAL FIELD

Embodiments described herein generally relate to an apparatus and method for controlling a restricted mode in a vehicle.

BACKGROUND

It is known to provide a mechanism for enabling an authorized driver to enter a code into a vehicle to put the vehicle into a "valet mode". One example of this type of implementation is disclosed directly below.

U.S. Pat. 5,467,070 to Drori et al. provides a vehicle security system having a secure valet/programming switch. To either enter the system valet mode, or select a function via the valet/programming switch, the user must first enter a valid personal access code via the switch. To prevent an intruder from deciphering the personal code by trying various codes, the system ignores, after a preset number of successive invalid entries, further switch inputs for a preset period of time. When attempts to decipher the code are detected, the alarm is tripped, and the siren will sound. To accommodate various drivers of the same vehicle, more than one valid code can be stored in the system. Any of the personal access codes may be changed any time, but after the user's present code is entered.

SUMMARY

An apparatus for controlling a restricted mode of a vehicle is provided. The apparatus includes a controller that is configured to receive a first input indicative of a request to change the vehicle from a fully operational mode to a restricted mode. The controller is further configured to monitor door status for a driver in response to receiving the first input and to activate the restricted mode if the door status indicates a transition from an opened state to a closed state.

An apparatus for controlling a restricted mode is provided. The apparatus includes a controller that is configured to receive a first input from a primary driver corresponding to a request to change a vehicle from a fully operational mode to a restricted mode for a secondary driver. The controller is further configured to initiate a first timer for preventing the vehicle from exiting from the restricted mode to the fully operational mode if an occupant communication device belonging to the primary driver is detected by the vehicle prior to the first timer expiring.

An apparatus for controlling a restricted mode is provided. The apparatus comprises a controller that is configured to receive an input from a primary driver corresponding to a request to change a vehicle from a fully operational mode to a restricted mode for a secondary driver. The controller is further configured to initiate a first timer such that the vehicle is prevented from exiting from the restricted mode to the fully operational mode in the event the first timer has not expired.

DETAILED DESCRIPTION

The embodiments set forth herein generally illustrate and describe a plurality of controllers (or modules), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle. The controllers may be combined with each other and/or separated in any manner based on the particular type of electrical architecture that is desired in the vehicle. It is generally recognized that each controller and/or module/device disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

Figure 1:
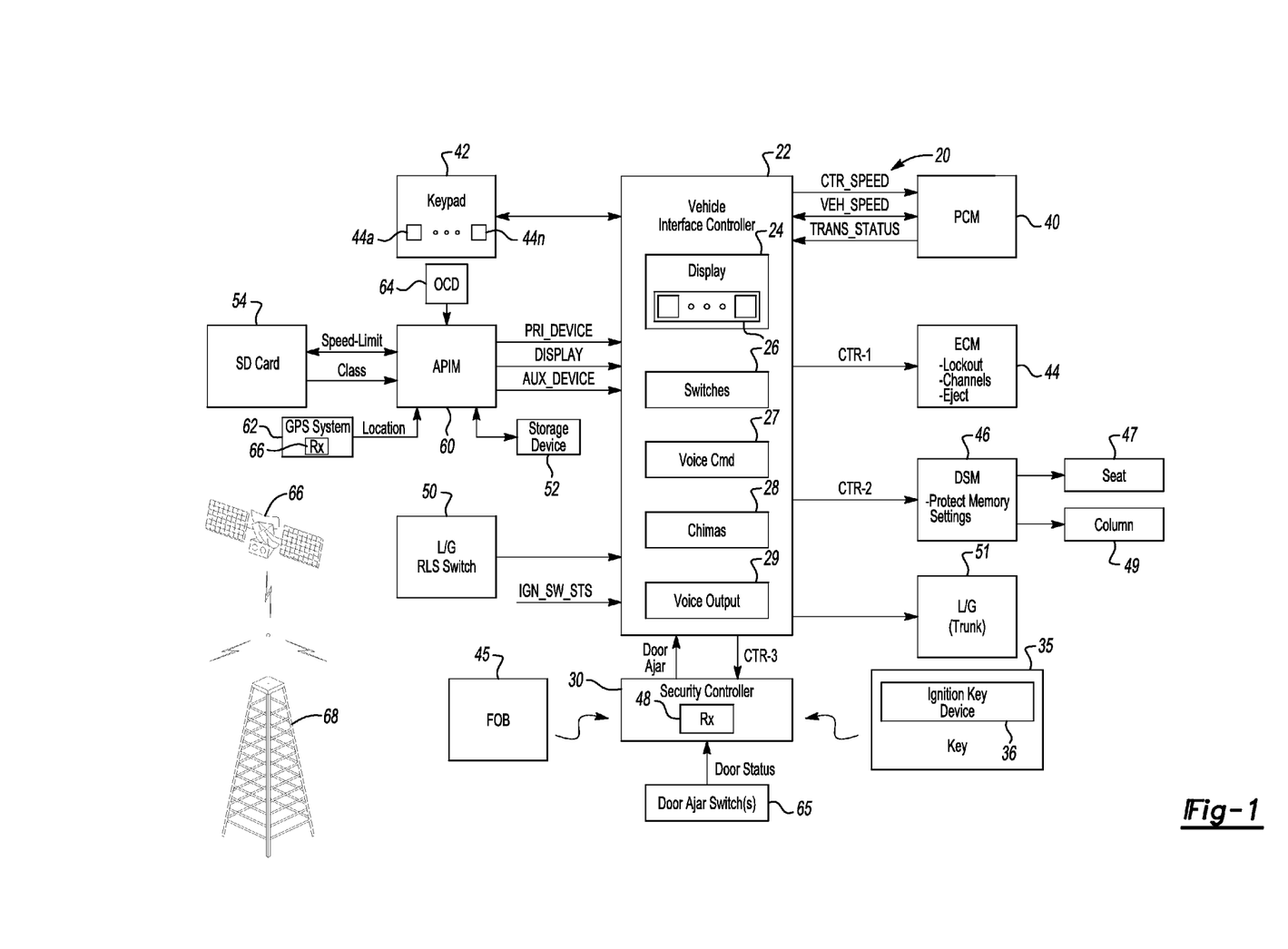
FIG. 1 depicts a system for controlling a restricted mode and for automatically exiting the restricted mode in accordance to one embodiment of the present invention.

FIG. 1 depicts a system 20 for controlling a restricted mode and for automatically exiting the restricted mode in accordance to one embodiment of the present invention. The system 20 generally comprises a vehicle interface device (or controller) 22. The controller 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message.

The controller 22 also includes a plurality of switches 26, a voice recognition command interface 27, chimes 28, and voice output capability 29. The driver may toggle the switches 26 to view different messages and/or select various options. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the controller 22 may activate the chimes 28 when the vehicle is near a top speed, the vehicle has achieved a top speed, the vehicle has exceeded the top speed, there is a low level of fuel in the fuel tank, and/or when the traction control is enabled. In one example, the voice output capability 29 enables the controller 22 to transmit audio signals to the driver in the manner, but not limited to, that described in the '440 publication. In one example, the switches 26 may be positioned within the display 24 such that the display 24 and the switches function as a touch screen. The switches 26 may be implemented as alpha-numeric characters. The significance of the switches 26 will be discussed in more detail below. While the display 24, the switches 26, the voice input command interface 27, chimes 28, and the voice output capability 29 are shown within the controller 22, it is contemplated that one or more of these mechanisms may be positioned exterior to the controller 22.

A security controller 30 is operably coupled to the controller 22. While FIG. 1 generally illustrates that the security controller 30 is positioned outside of the controller 22, other implementations may include the security controller 30 being implemented directly within the controller 22. In general, one or more of the signals transmitted to/from the controller 22 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 35. The controller 22 may receive a signal IGN_SW_STS from a body controller (not shown) to determine the position of the ignition switch. The key 35 includes an ignition key device 36 embedded therein for communicating with the vehicle. The ignition key device 36 may be in the form of a transponder that includes an integrated circuit and an antenna. The transponder is adapted to transmit an electronic code wirelessly to the security controller 30. The security controller 30 compares the electronic codes to predetermined data to ensure that the key is authorized to start an engine of the vehicle. The security controller 30 transmits a first authorization signal to the controller 22 via the data communication bus. A powertrain control module (PCM) 40 is operably coupled to the controller 22. The controller 22 transmits a second authorization signal to the PCM 40. The PCM 40 enables an engine to start in response to the second authorization signal. The PCM 40 is configured to provide a signal VEH_SPEED over the data communication bus to the controller 22. The signal VEH_SPEED corresponds to the speed of the vehicle. The controller 22 may transmit a signal CTR_SPD to the PCM 40. The signal CTR_SPD may correspond to a command to instruct the PCM 40 to limit a top speed of the vehicle and/or vehicle acceleration. The PCM 40 may transmit a signal TRANS_STATUS to the controller 22. The signal TRANS_STATUS may correspond to transmission status (e.g., park, reverse, neutral, drive, low (automatic transmission)).

A keypad 42 is operably coupled to the controller 22 (or to the security controller 30). The keypad 42 may be positioned on an exterior of the vehicle. The keypad 42 includes a plurality of switches 44*a* and 44*n*. The switches 44*a*-44*n* may be in the form of letters, numbers, or any combination thereof (e.g., alpha-numeric). A user may use the keypad 42 to gain entry into the vehicle. For example, the user may enter a predetermined code via the switches 44*a*-44*n*. The code may be transmitted electronically either hardwire, by the data communication bus, or wirelessly to the controller 22. The controller 22 receives the code from the keypad 22 and compares to an authorized code. If the received code matches the authorized code, then the controller 22 may control one or more lock mechanisms (not shown) that are positioned about vehicle doors to unlock the door.

The controller 22 may also use data received from the switches 44*a*-44*n* of the keypad 42 and/or from the switches 26 of the controller 22 to determine whether an authorized driver has put the vehicle in a restricted mode. The restricted mode generally corresponds to a vehicle state in which one or more vehicle controllers in the vehicle restrict the level of functionality provided for a particular driver. A driver may enter a predetermined code via the switches 44*a*-44*n* of the keypad and/or from the switches 26 of the controller 22 to place the vehicle in the restricted mode in moments in which it is desired to limit vehicle functionality for a particular driver.

It is recognized that the predetermined code that is entered via the switches 26 may correspond to a personalized code that is established by the primary driver (via the controller 22) and that the predetermined code entered via the switches 44*a*-44*n* may be a factory code that is used to unlock the vehicle (in a similar manner the factory code may be changed by the primary driver to a personalized code for entry into the keypad 42 to unlock the vehicle—this may be accomplished by programming sequence via the keypad 42). The predetermined code as referenced hereafter may correspond to the personalized code (entered either through the switch 26 or switches 44*a*-44*n*) or the factory code (entered through the switches 44*a*-44*n*).

In one example, it may be desirable to limit vehicle functionality when a valet, technician/mechanic or employee is given temporary possession of the vehicle for performing a specific task. The valet, technician/mechanic, or employee may be defined as a secondary driver. It is recognized that other drivers who may not have complete control, ownership of the vehicle, and/or some form of diminished authority, may also be recognized as a secondary driver. A primary driver is generally defined as a driver who has full control over vehicle functionality by means of ownership or other entitlement.

While entry of the predetermined code via the switches (e.g., via the controller 22 or the keypad 42) may place the vehicle in the restricted mode, additional inputs may be used as a pre-condition to place the vehicle in the restricted mode. For example, the controller 22 may further require that the vehicle is in park either before or after receiving the proper code via the switches 76 or 44*a*-44*n*. The controller 22 receives the signal TRANS_STATUS to monitor whether the vehicle is in park when the code is entered via the switches. The additional step of ensuring that the vehicle is in park may assist in minimizing driver distraction and may allow the PCM 40 to modify its calibration to limit speed and/or acceleration. For example, when the vehicle is placed in the restricted mode, the controller 22 transmits the signal CTR_SPD to the PCM 40 such that the PCM 40 controls a top speed or acceleration of the vehicle. In one example, the PCM 40 may limit the top speed of the vehicle to 35 mph and/or the acceleration to 9 ft./s2. The requirement of placing the vehicle in park as a precondition to place the vehicle in the restricted mode is optional.

Additional features may be controlled when the vehicle is in the restricted mode. An entertainment control module (ECM) 44 is operably coupled to the controller 22 via the bus. The ECM 44 is generally configured to transmit audio and/or video signals for one or more occupants in the vehicle for entertainment purposes. In the restricted mode, the controller 22 transmits a signal CTR_1 to the ECM 44. The ECM 44 determines whether the vehicle is in the restricted mode based on the signal CTR_1. In response to the ECM 44 receiving the signal CTR_1 indicating that the vehicle is in the restricted mode, the ECM 44 may disable the function of transmitting audio and/or video signal or the ECM 44 may prevent the secondary driver from overriding or changing pre-stored channels as established by the primary driver. The ECM 44 may also prevent the secondary driver from ejecting any discs (e.g. CDs, DVDs, etc.) that are housed therein when the vehicle is in the restricted mode.

A driver seat module 46 (DSM) is operably coupled to the controller 22 via the bus. The DSM 46 is generally configured to control the movement of a seat 47 in the vehicle such that the seat 47 is moved to a desired position for the driver. The DSM 46 is also generally configured to provide for a memory seat function. For example, the primary driver may store one or more seat positions via switches (not shown) such that the seat 47 is moved to at least one preset position as established by the primary driver. In the restricted mode, the controller 22 transmits a signal CTR_2 to the DSM 46. The DSM 46 determines whether the vehicle is in the restricted mode based on the signal CTR_2. In response to the DSM 46 receiving the signal CTR_2 indicating that the vehicle is in the restricted mode, the DSM 46 may prevent the secondary driver from overriding or changing the pre-stored seat positions as established by the primary driver. The DSM 46 may also control the position of a steering column and/or exterior mirrors 49. In a similar fashion to that described directly above, in the event the vehicle is detected to be in the restricted mode, the DSM 46 may not allow the secondary driver to erase or override stored positions of the steering column and/or exterior mirrors 49.

The security controller 30 includes a receiver 48 for receiving wireless signals from a keyfob 45 or other suitable device. The security controller 30 may unlock/lock one or more doors (not shown) of the vehicle and/or open the liftgate (or trunk) 51 of the vehicle in response to the wireless signals transmitted by the fob 45. While the vehicle is in the restricted mode, the security controller 30 may not allow the liftgate 51 to open in the event the secondary driver attempts to use the fob to open the liftgate 51 of the vehicle. Conversely, a liftgate release switch 50 may be operably coupled to the controller 22. The controller 22 may be situated to open the liftgate 51 in response to the liftgate release switch 50 being depressed. The controller 22 may ignore requests from the liftgate release switch to open the liftgate 51 when the vehicle is in the restricted mode. Such a feature may prevent the secondary driver from gaining access to the liftgate area (or trunk) where personal property belonging to the primary driver may be stored. A door ajar switch 65 positioned on each door and/or liftgate of the vehicle is operably coupled to the security controller 30. The door ajar switch 65 transmits a signal DR_STATUS, which indicates whether a particular door is open or closed (e.g., a driver door, a passenger door, and/or liftgate). This feature will be discussed in more detail below.

The vehicle may restrict the operation of additional features than those noted above while the vehicle is in the restricted mode. For example, the controller 22 may limit or altogether disable the voice command 27 and/or voice output 29 features, track distance of the vehicle while the vehicle is driven by the secondary driver, monitor various auxiliary devices (will be described in more detail below), and/or force on various safety related features. Examples of safety related features that may be forced on include, but not limited to, traction control, park aid, forward collision warning, seat belt minder feature, lane departure warning. Examples of these systems are described in U.S. Publication No. 2011/0082625, filed on Dec. 13, 2010, which is hereby incorporated by reference in its entirety.

The controller 22 is generally configured to exit from the restricted mode when the primary driver inputs the pre-selected code again via the switches 26 and/or 44*a*-44*n* or any other operation as described in connection with FIGS. 2*a*-2*d*. Upon exiting the restricted mode, the controller 22 may generate a usage report that provides information related to the distance, speed, etc. of the secondary driver while the vehicle was in the restricted mode. The vehicle may automatically exit from the restricted mode when the controller 22 detects that the vehicle has been driven by the secondary driver for over a predetermined distance limit. In one example, the predetermined distance limit may correspond to 5 miles. In this case, when the primary driver regains access to the vehicle and notices that the vehicle has a speed or acceleration limitation in place, the primary driver will have notice that the secondary driver had driven the vehicle over the predetermined distance limit. The other restrictions will remain in place so long as the vehicle is in the restricted mode. The motivation to remove the speed/acceleration limitation while in the restricted mode may benefit the primary driver. For example, the primary driver may regain control of the vehicle and may have forgotten the code to move the vehicle out of the restricted mode. In this case, the primary driver may be able to drive the vehicle without speed and/or acceleration restrictions (i.e., limp home mode) to get the vehicle to a desired location (e.g., residence of primary driver). At this point, the primary driver may place a first programmed key in the ignition and turn to "RUN" and back to "OFF". Within X seconds, the primary driver may place a second programmed key in the ignition and turn to "RUN" and back to "OFF". The vehicle will exit from the restricted mode if two programmed keys are inserted and toggled from "RUN" to "OFF". The above-described process is generally defined as "ONE-TWO New Procedure".

The controller 22 visually and/or audibly communicates to the primary driver that the vehicle was driven over the predetermined distance limit when the vehicle exits out of the restricted mode. In this implementation, the restricted mode may remain intact even when the vehicle is driven over the predetermined distance limit.

An auxiliary protocol interface module (APIM) (or communication module) 60 is operably coupled to the controller 22. The APIM 60 is configured to receive an occupant communication device (OCD) 62. The APIM 60 is generally part of an in-vehicle communication system which interfaces with the OCD 62 to enable voice input control to perform a function with the OCD 62 so that the driver does not have to enter data directly into the OCD 62. The APIM 60 may interface via switches (not shown) positioned within the vehicle to enable touch selection control to perform a function with the OCD 62 so that the driver does not have to enter data directly into the OCD 62. The OCD 62 is wirelessly coupled to the APIM 60. In one example, the APIM 60 may be implemented as part of the SYNC system developed by Ford Motor Company® and Microsoft®. The OCD 62 may include any number of communication devices that use a wireless protocol. For example, one such wireless protocol may include Bluetooth™. The OCD 62 may use any protocol that is generally situated to facilitate wireless communication. Switches may be positioned on the APIM 60, the vehicle's steering wheel (not shown), the ECM 44, or on the controller 22 to enable touch input.

As noted above, in the restricted mode, the controller 22 and/or the APIM 60 may monitor auxiliary devices. Examples of auxiliary devices include a storage device 52 (e.g., USB storage device), a secure digital (SD) card 54, or Media Player (MP3) (not shown). In one example, the SD card 54 may be a memory map device that includes topographical maps that are used in connection with a global positioning system (GPS) 64.

Detection of the OCD 62 may be used as a mechanism to cause the vehicle to exit the restricted mode. For example, when the OCD 62 belonging to the primary driver is detected to be operably coupled to the APIM 60 when the vehicle is in the restricted mode, the APIM 60 may transmit a signal PRI_DEVICE to the controller 22 to alert the controller 22 that the primary driver is in the vehicle. The controller 22 may exit the restricted mode in response to the signal PRI_DEVICE indicating that the OCD 62 belonging to the primary driver is detected. The APIM 60 is generally configured to associate the first OCD 62 that is programmed thereto as belonging to the owner of the vehicle (or the primary driver). In addition, the primary driver may selectively program any OCD 60 as a primary device. As such, when the APIM 60 detects that the primary device is in the vehicle while the vehicle is in the restricted mode, the controller 22 may automatically exit from the restricted mode.

The global positioning satellite (GPS) system 64 includes a receiver and is operably coupled to the APIM 60 via the data communication bus. The GPS system 64 enables the driver of the vehicle to locate a particular destination by providing the driver with driving directions to reach the particular destination. The GPS system 64 is configured to provide a signal LOCATION to the APIM 60. The signal LOCATION corresponds to coordinate data that is used to identify the location of the vehicle. The GPS system 64 may use the coordinate data that is used to identify the location of the vehicle to, among other things, obtain driving directions to reach a particular destination. The data on the signal LOCATION may comprise latitude and longitudinal information corresponding to the various locations of the vehicle while driven by the primary driver or the secondary driver. In general, a plurality of satellites 66 and/or a plurality of ground stations 68 communicate with the GPS system 64 to establish the location of the vehicle. For example, the GPS system 64 is capable of establishing the vehicle's position and velocity relative to the earth's surface processing data received from the plurality of satellites 66 and/or the ground stations 68.

As the vehicle moves latitudinally and/or longitudinally across the earth's surface, the GPS system 64 is capable of presenting the position of the vehicle with reference coordinates that correspond to, among other things, the latitude and longitude on the earth's surface. It is generally known that the implementation of a GPS system 64 on a vehicle is capable of providing the position of the vehicle via latitude and longitude coordinates relative to the earth's surface.

As noted above, the memory map device 54 includes, but not limited to, topographical maps stored therein may be received by the APIM 60 so that a pictorial map of the location in which the vehicle is positioned in real time can be provided over a signal DISPLAY to the controller 22. The memory map device 54 also includes posted speed limits for a particular road that is being driven on by the driver or functional class information for a particular road that is being driven on that is also capable of being sent from the APIM 60 to the controller 22. The memory map device 54 is known to include pictorial map data, posted speed limits, and/or functional class information that can be provided to the driver. The APIM 60 may merge the stored latitude and longitude data, the pictorial map data, the posted speed limits, and/or the functional class information provided by the memory map device 54 so that a visual display can be presented over the signal DISPLAY to the controller 22. The storage controller 22 may be implemented as a USB compatible memory stick and be used by the driver to upload various vehicle preferences into the vehicle, such as preset radio stations, memory seat positions, temperature control data, personalized pictures for presentation on display 24, etc.

The storage device 52 and the memory map device 54 are portable devices that may be generally accessible to one or more vehicle occupants. In the event the vehicle is driven by the secondary driver, it may be noteworthy to notify the primary driver that such devices were removed when the vehicle was driven by the secondary driver. The APIM 60 monitors whether the storage device 52 and/or the SD card 54 are operably coupled thereto. In the event the APIM 60 determines that the storage device 52 and/or the SD card 54 (or other auxiliary device) are removed, the APIM 60 transmits a signal AUX_DEVICE to the controller 22. The controller 22 generates an alert that the storage device 52 and/or the SD card 54 are removed.

FIGS. 2a-2d depict a method 100 for entering into the restricted mode and for performing various vehicle operations when the vehicle is in the restricted mode in accordance to one embodiment of the present invention. The particular order of the operations in the method 100 when performed can be in any order and are not to be limited to only being performed sequentially. The order of the operations may be modified and vary based on the desired criteria of a particular implementation.

Figure 2A:
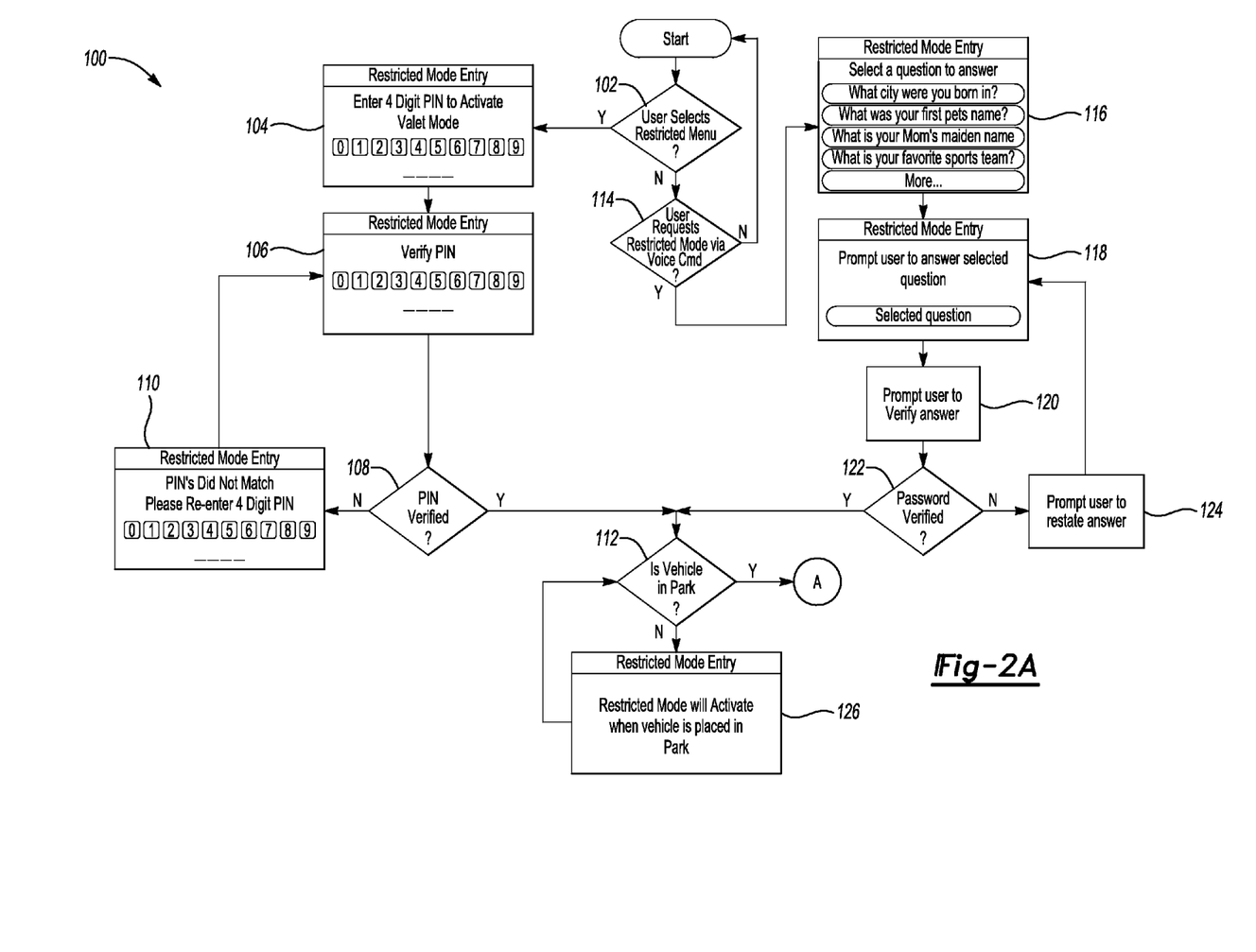
FIGS. 2a-2d depict a method for controlling the restricted mode in accordance to one embodiment of the present invention.

In operation 102, the primary driver may select a restricted mode menu in the controller 22. The menu may be displayed on the display 24 and the selections may occur via switches 26. If the primary driver has selected the restricted mode menu, then the method 100 moves to operation 104. If the primary driver has not selected the restricted mode menu, then the method 100 moves to operation 114.

In operation 104, the primary driver may enter the predetermined code into the controller 22 via the switches 26 in the controller 22.

In operation 106, the primary driver may reenter the predetermined code into the controller 22 via the switches 26 to verify the code.

In operation, 108, the controller 22 determines whether the proper predetermined code has been entered. If the proper predetermined code has not been entered, then the method 100 moves to operation 110. If the proper predetermined code has been entered, then the method 100 moves to operation 112.

In operation 110, the controller 22 may notify the driver that the proper predetermined code has not been entered, or did not match and request that the primary driver enter the predetermined code again.

In operation 112, the controller 22 may determine whether the vehicle is in park. For example, the controller 22 may monitor the signal TRANS_STATUS to assess the transmission status. It is recognized that the controller 22 may command the primary driver to place the vehicle in park after receiving the predetermined code. If the vehicle is not in park, then the method 100 moves to operation 126. If the vehicle is in park, then the method moves to operation 128.

In operation 114, (the method 100 moves to operation 114 if it is determined that the user did not select the restricted mode) the primary driver may request to enter into the restricted mode via voice command 27. If the user did not request to enter into the restricted mode via the voice command 27, then the method 100 moves back to start. If the user did request to enter into the restricted mode via the voice command 27, then the method 100 moves to operation 116.

In operation 116, the controller 22 prompts the primary driver to select a question to answer to authenticate the primary driver.

In operation 118, the controller 22 provides the question selected by the primary driver for the corresponding answer. The answer in this case serves as the password.

In operation 120, the controller 22 prompts the primary driver to verify the answer by asking the primary driver to provide the answer (or password) again.

In operation 122, the controller 22 verifies the password. If the controller 22 fails to verify the password, then the method 100 moves to operation 124. If the device verifies the password, then the method 100 moves to operation 112.

In operation 124, the controller 22 prompts the primary driver to enter the answer again.

In operation 126, the controller 22 has failed to detect the vehicle is in park. The method 100 then moves back to operation 112.

Figure 2B:
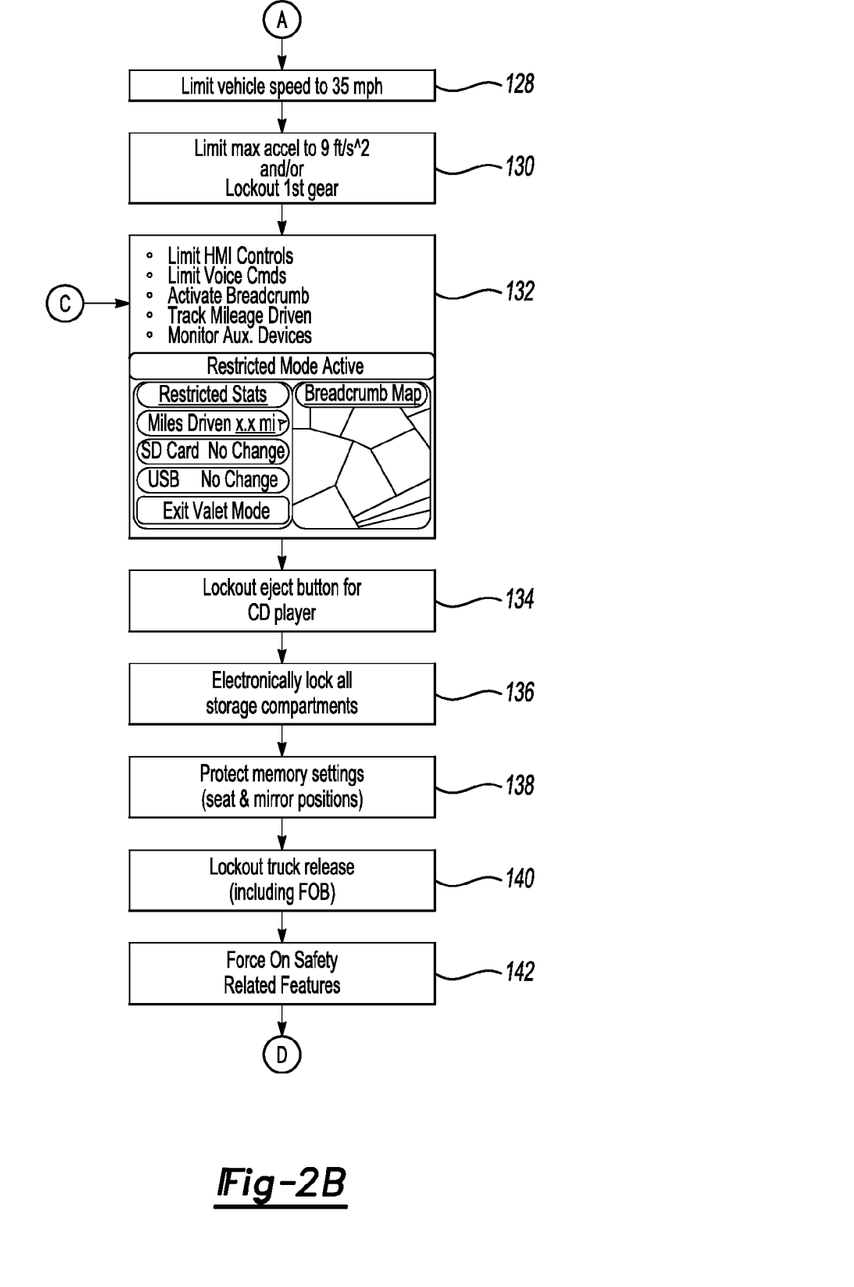

In operation 128, the controller 22 commands the PCM 40 to limit the speed of the vehicle to a predetermined speed. As noted above, one example of a predetermined speed may be 35 mph. By limiting the speed, the temptation for the valet driver to take the vehicle from the premises in which the primary driver is located may be reduced. The predetermined speed may correspond to a vehicle speed that is suitable to enable a valet driver to park the vehicle.

In operation 130, the controller 22 commands the PCM 40 to limit a max acceleration speed and/or lock the vehicle out of 1st gear. By limiting acceleration, aggressive driving may be limited such as spinning tires, etc.

In operation 132, the controller 22 may (i) limit various human machine interfaces, (ii) limit its capability to response to voice input(s), (iii) limit its capability to audibly prompt the secondary driver, (iv) activate a breadcrumb trail via the GPS system 64 (e.g., vehicle will monitor where the vehicle has been driven while in the restricted mode and visually display trail on display 24), (v) track the distance driven, and (vi) monitor the status of various auxiliary devices such as, but not limited to, the storage device 52 and the SD card 54 has been removed from the vehicle. An example describing the manner in which a controller may activate a breadcrumb trail via the GPS system 64 when the SD card 54 is removed is set forth in co-pending U.S. Patent Publication No. 2009/0326813, filed on Jun. 26, 2009 which is hereby incorporated by reference.

The controller 22 may include a restricted mode display menu for depicting miles driven, places visited, and the status of the storage device 52 and the SD card 54.

In operation 134, the controller 22 may command the ECM 44 to lock out the disc eject feature and to lock all preset stations.

In operation 136, the controller 22 may control locking mechanism associated with various storage compartments (e.g., glove box, center console storage, etc.) to remain in a locked state when the vehicle is in the restricted mode.

In operation 138, the controller 22 may control the DSM 46 to protect all pre-stored locations for the steering column, seats 47, or mirrors 49.

In operation 140, the controller 22 locks out the liftgate release feature (including the liftgate release switch on the fob).

In operation 142, the controller 22 forces on all safety related features.

In operation 144, the controller 22 determines whether the storage device 52 is missing (or has been removed). If the storage device 52 is not missing, the method 100 moves to operation 146. If the storage device 52 is missing, then the method 100 moves to operation 148.

In operation 146, the controller 22 determines whether the SD card 54 is missing (or has been removed). If the SD card 54 is not missing, then the method 100 moves to operation 150. If the SD card 54 is missing, then the method 100 moves to operation 160.

In operation 150, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 152.

In operation 152, the controller 22 controls the PCM 40 to remove the vehicle speed restriction.

In operation 154, the controller 22 controls the PCM 40 to remove the vehicle acceleration restriction.

In operation 156, the controller 22 notifies the primary driver that the vehicle has been driven over the predetermined distance limit. This condition alerts the primary driver that the vehicle has been driven over a distance that was not believed to be necessary for the secondary driver to perform the task desired by the primary driver.

Figure 2C:
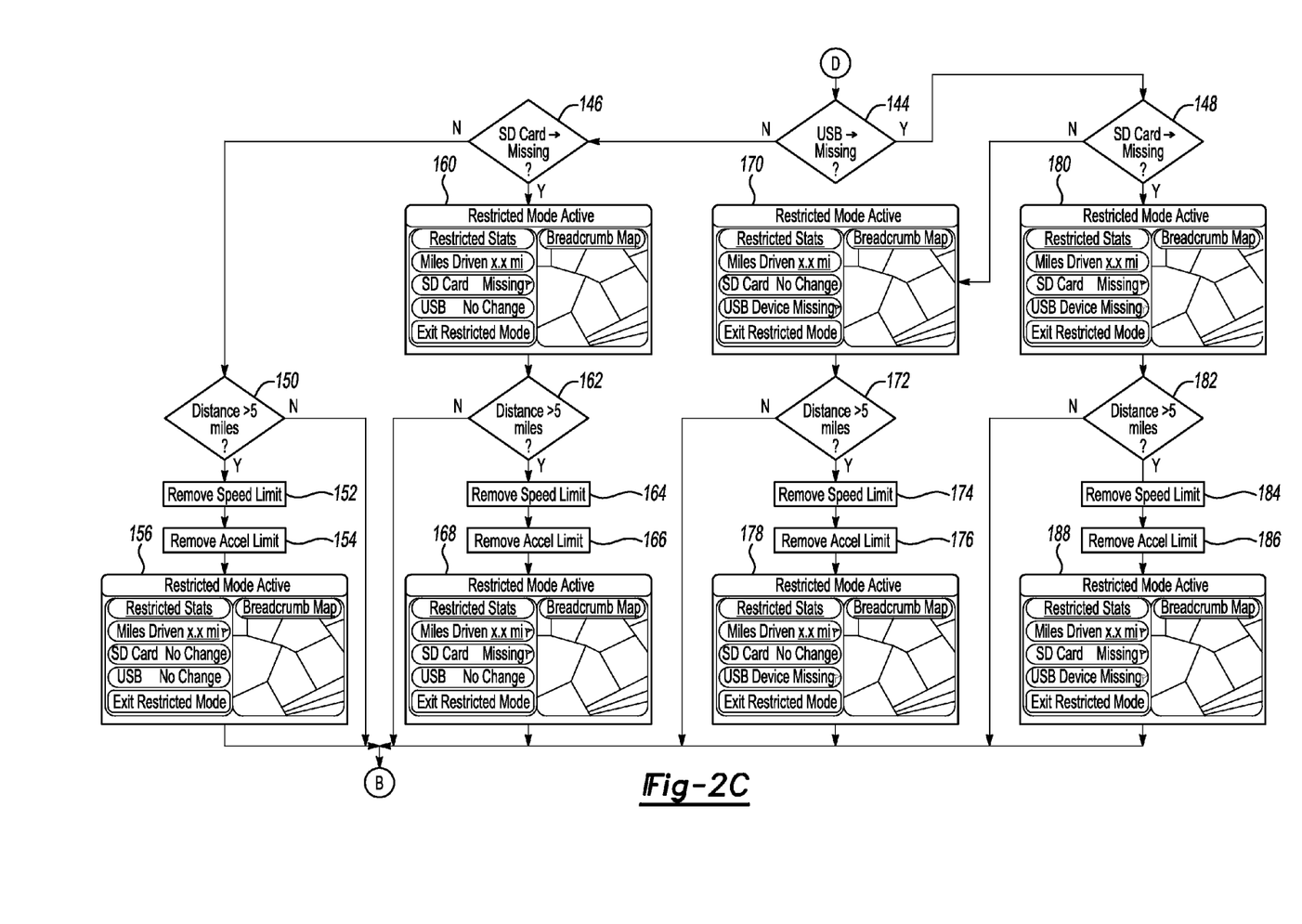

In operation 160, the controller 22 notifies the primary driver that the SD card 54 is missing.

The controller 22 may notify the primary driver that the SD card 54 may have been removed and then re-inserted back into the vehicle. In another implementation, the controller 22 may also notify the primary driver that the SD card 54 may have been removed and replaced with an entirely different SD card 54. In this implementation, the APIM 60 may read or record data form the SD card 54 which provides identify of such SD card 54. In the event the vehicle is in the restricted mode, and the APIM 60 receives data from a new SD card 54 which indicates that a new SD card 54 was inserted into the vehicle while in the restricted mode, the APIM 60 may notify the controller 22 of the presence of a new SD card 54 in the vehicle. The controller 22 may then notify the primary driver of the new SD card 54 once the vehicle transitions from the restricted mode back to the normal operating mode. This may alert the primary driver that the original SD card 54 belonging to the primary driver may have been replaced with an SD card 54 provided by the secondary driver which may be cheaper (or a generic version) of the SD card 54.

In operation 162, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 164.

In operation 164, the controller 22 controls the PCM 40 to remove the vehicle speed restriction.

In operation 166, the controller 22 controls the PCM 40 to remove the vehicle acceleration restriction.

In operation 168, the controller 22 notifies the primary driver that the vehicle has been driven over the predetermined distance limit and that the SD card 54 was removed. This condition alerts the primary driver that the vehicle has been driven over a distance that was not believed to be necessary for the secondary driver to perform the task desired by the primary driver and that the secondary driver has taken the SD card 54.

In operation 170, the controller 22 notifies the primary driver that the storage device 52 is missing.

The controller 22 may notify the primary driver that the storage device 52 may have been removed and then re-inserted back into the vehicle. In another implementation, the controller 22 may also notify the primary driver that the storage device 52 may have been removed and replaced with an entirely different storage device 52. In this implementation, the APIM 60 may read or record data form the storage device 52 which provides identify of such storage device 52. In the event the vehicle is in the restricted mode, and the APIM 60 receives data from a new storage device 52 which indicates that a new storage device 52 was inserted into the vehicle while in the restricted mode. At this point, the APIM 60 may notify the controller 22 of the presence of a new storage device 52 in the vehicle. The controller 22 may then notify the primary driver of the new storage device 52 once the vehicle transitions from the restricted mode back to the normal operating mode. This may alert the primary driver that the original storage device 52 belonging to the primary driver may have been replaced with a storage device 52 provided by the secondary driver which may be cheaper (or a generic version) of the storage device 52.

In operation 172, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 174.

In operation 174, the controller 22 controls the PCM 40 to remove the vehicle speed restriction.

In operation 176, the controller 22 controls the PCM 40 to remove the vehicle acceleration restriction.

In operation 178, the controller 22 notifies the primary driver that the vehicle has been driven over the predetermined distance limit and that the storage device 52 has been removed. This condition alerts the primary driver that the vehicle has been driven over a distance that was not believed to be necessary for the secondary driver to perform the task desired by the primary driver and that the secondary driver has taken the storage device 52.

In operation 180, the controller 22 notifies the primary driver that the storage device 52 and the SD card 54 are missing.

In operation 182, the controller 22 determines whether the vehicle has been driven over the predetermined distance limit. If the vehicle was not driven past the predetermined distance limit, then the method 100 moves to operation 190. If the vehicle has been driven past the predetermined distance limit, then the method 100 moves to operation 184.

In operation 184, the controller 22 controls the PCM 40 to remove the vehicle speed restriction.

In operation 186, the controller 22 controls the PCM 40 to remove the vehicle acceleration restriction.

In operation 188, the controller 22 notifies the primary driver that the vehicle has been driven over the predetermined distance limit and that both the storage device 52 and the SD card 54 have been removed. This condition alerts the primary driver that the vehicle has been driven over a distance that was not believed to be necessary for the secondary driver to perform the task desired by the primary driver and that the secondary driver has taken the storage device 52 and the SD card 54.

Figure 2D:
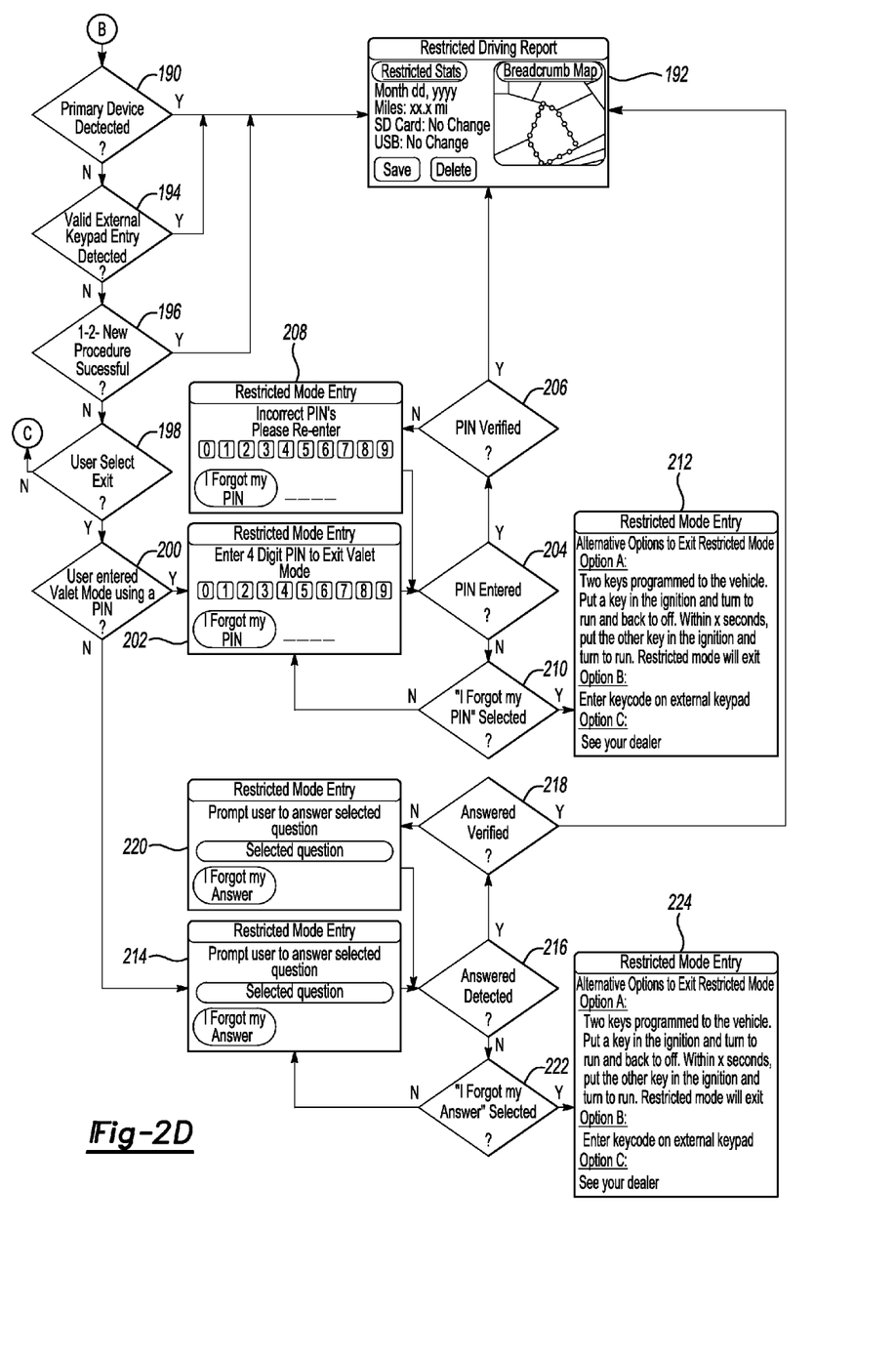

In operation 190, the controller 22 determines whether the primary device (such as the owner's phone) has been detected. If the primary device has been detected, then the method 100 moves to operation 192. If the primary device has not been detected, then the method 100 moves to operation 194.

In operation 194, the controller 22 determines whether the predetermined code was entered via the switches 44a-44n of the keypad 42. If the proper code was entered, then the method 100 moves to operation 192. If not, then the method 100 moves to operation 196.

In operation 196, the controller 22 determines whether the primary driver has inserted two already programmed keys as noted in connection with the One-Two New Procedure as described above. If the primary driver has successfully performed the One-Two New Procedure, then the method 100 moves to operation 192. If not, then the method 100 moves to operation 198. The vehicle will exit the restricted mode in the event the primary driver performs the One-Two New Procedure. By successfully performing the One-Two New Procedure, this indicates that the driver has possession of two or more valid keys to the vehicle.

In operation 192, the controller 22 provides a restricted mode report, which depicts various activities (as noted above) that occurred while the vehicle was driven by the secondary driver. The controller 22 generates the report in response to determining that the operations noted in operations 190, 194, and 196 are found to be true.

In operation 198, the controller 22 determines whether the primary driver has selected the "exit restricted mode" prompt as shown in 156, 168, 178, and 188. If so, the method 100 moves to operation 200. If not, the method 100 moves back to operation 132.

In operations 200, 202 and 204, the controller 22 determines whether the driver has entered the predetermined code via the switches 26 thereon so that the primary driver is capable of accessing a restricted mode prompt on the controller 22 itself for the purpose of disabling the restricted mode. If the driver has entered the predetermined code, then the method 100 moves to operation 202. If this condition is not true, then the method 100 moves to operation 214.

In operation 202, the controller 22 prompts the primary driver to enter the predetermined code via the switches 26.

In operation 204, the controller 22 determines whether the predetermined code was entered. If the predetermined code has been entered, then the method 100 moves to operation 206. If not, then the method 100 moves to operation 210.

In operation 206, the controller 22 determines predetermined code is a valid PIN. If valid, the method 100 moves to operation 192 and generates the restricted mode report. If not valid, the method moves to operation 208.

In operation 208, the controller 22 prompts the primary driver to re-enter the predetermined code again.

In operation 210, the controller 22 determines whether the primary driver selected the option on the display 24 in which a valid PIN is forgotten by the primary driver. If the valid PIN was forgotten, then the method 100 moves to operation 212.

In operation 212, the controller 22 waits to determine if the primary driver is successful in performing the One Two New Procedure or enters a valid code via the switches 44a-44n to exit out of the restricted mode.

In operation 214, the primary driver may control the controller 22 via the switches 22 to provide a question prompt to enable the primary driver to exit from the restricted mode.

In operation 216, the controller 22 determines whether an answer was received in response to the question via touch entry or voice input command. If the answer is detected, then the method 100 moves to operation 218. If not, then the method 100 moves to operation 222.

In operation 218, the controller 22 determines whether the answer is correct. If the answer is correct, then the method 100 moves to operation 192 to generate the restricted mode report. If the answer is not correct, then the method 100 moves to operation 220.

In operation 220, the controller 22 prompts the primary driver again to re-answer the question.

In operation 222, the controller 22 determines whether the primary driver selected the option on the display 24 in which the answer is forgotten by the primary driver. If the answer was forgotten, then the method 100 moves to operation 224.

In operation 224, the controller 22 waits to determine if the primary driver is successful in programming a second key or enters a valid code via the switches 44a-44n to exit out of the restricted mode.

Figure 3:
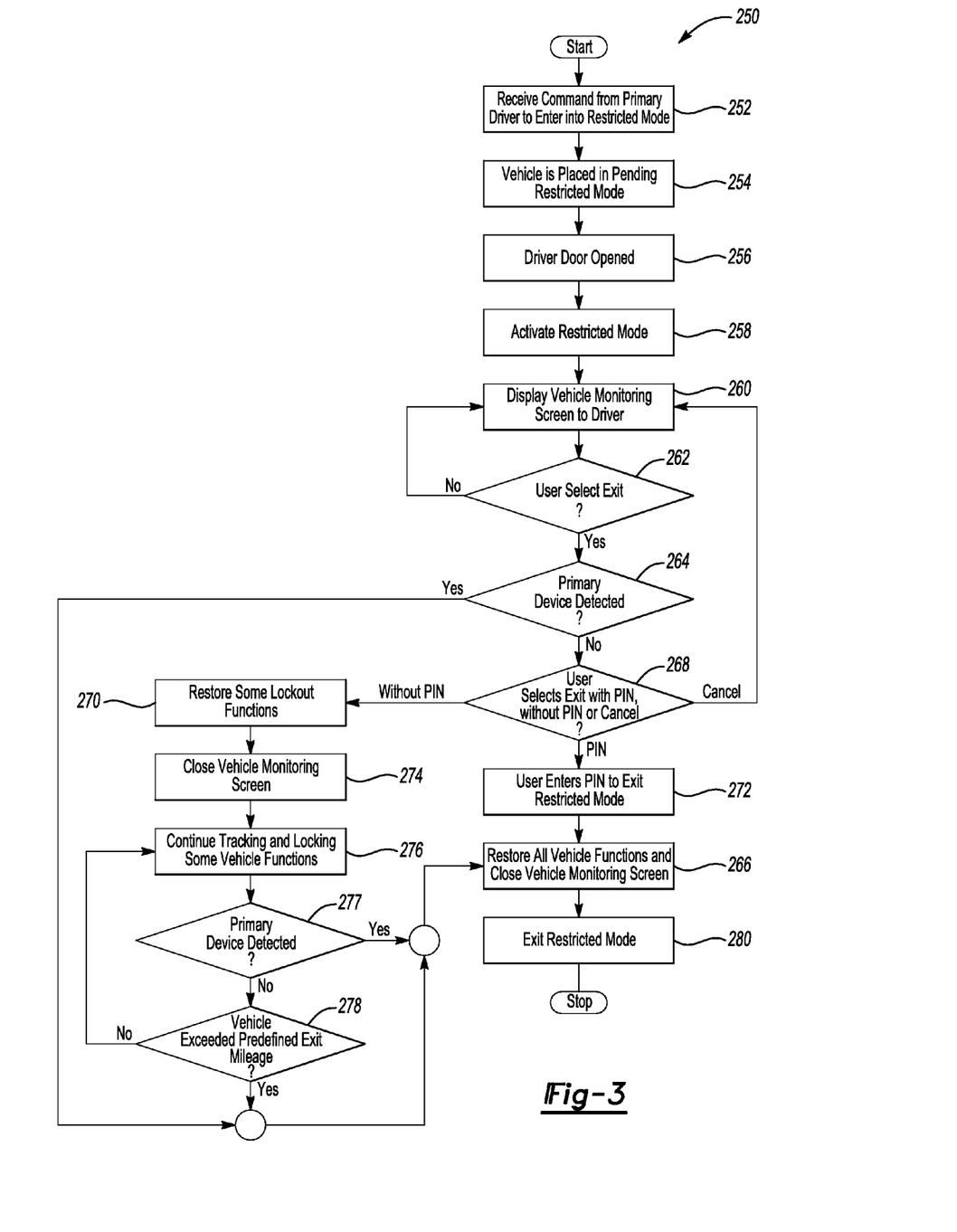
FIG. 3 depicts a method for controlling the restricted mode in accordance to one embodiment of the present invention.

FIG. 3 depicts a method 250 for controlling the restricted mode in accordance to one embodiment of the present invention. The particular order of the operations in the method 250 when performed can be in any order and are not to be limited to only being performed sequentially. The order of the operations may be modified and vary based on the desired criteria of a particular implementation.

In operation 252, the controller 22 determines that the primary driver desires to place the vehicle in the restricted mode. The manner in which the primary driver may place the vehicle in the restricted mode is explained above in connection with FIG. 2A.

In operation 254, the controller 22 places the vehicle in a pending restricted mode until additional predetermined vehicle event(s) occur. It is recognized that in the pending restricted mode, the display 24 may not allow the driver to control the ACM 44 for changing stations, volume control etc. or other features set by the primary driver.

In operation 256, the controller 22 waits for either the driver door to be opened (or waits for the vehicle to be placed in park as described above in connection with operations 112 and 126 of FIG. 2A). In relation to the driver door being opened, the controller 22 may monitor the signal DOOR_STATUS to determine whether the driver has opened the door.

In operation 258, the controller 22 activates the restricted mode when the driver door has opened.

In operation 260, the controller 22 removes the display generally provided to the primary driver and provides a display that shows that the vehicle is monitoring various attributes for the secondary driver, such as, distance driver, maximum speed, acceleration, and status of SD card 54 or storage device 52 (USB).

In operation 262, the controller 22 determines whether the user has elected to exit from the restricted mode. If so, then the method 250 moves to operation 264. If no, then the method 250 moves to operation 268.

In operation 264, the controller 22 determines whether the primary device (or OCD 64) belonging to the primary driver has been detected (e.g., the controller 22 monitors the signal PRI_DEVICE to indicate the presence of the primary device for the primary driver). If the primary device is detected, then the method 250 moves to operation 266. If not, the method 250 moves to operation 268. If the primary device is detected, it is presumed that the owner (or primary driver) is still in the vehicle. As such, it is no longer necessary for the vehicle to be placed in the restricted mode and the vehicle is returned into the fully operational mode.

In operation 266, the controller 22 restores all vehicle functions for the primary driver and removes the vehicle monitoring screen/operation.

In operation 268, the controller 22 determines the controller 22 may receive a command from the driver to exit the restricted mode. In this case, it may not be necessary for the driver to provide the PIN. The display 24 may include a prompt which allows the driver (e.g., the primary driver or the secondary driver) to exit out of the restricted mode. This feature is provided to account for situations in which the PIN cannot be remembered by the primary driver and the primary driver may not have either his/her primary device (or have his/her primary device paired to the vehicle).

When the driver elects to exit the restricted mode when (i) the primary device is not detected, (ii) a PIN is not provided, and (iii) by selecting the prompt on the display 24 to exit, such a condition is indicative of the vehicle being in a provisional restricted mode in which various features/functionality are still limited, however some functionality may be fully utilized. For example, when the vehicle is in the provisional restricted mode, the driver may be granted partial or full control of audio or video features (i.e., all features except for CD or video removal) related to the ECM 44. It is recognized that the vehicle, while in the restricted mode, may limit functionality offered for selection in the display 24 and access to various selectable fields in the display 24. When the vehicle is in the restricted mode, a generic screen may be offered, which allows the driver to exit from the restricted by means of inputting the PIN, or by means of exiting from the restricted mode and into the provisional restricted mode without having to enter the PIN. Prior to exiting from the restricted mode and into the provisional restricted mode without a PIN, the controller 22 notifies the driver that the vehicle will continue to lock various vehicle features, continue monitoring the features noted above in connection with operation 260, and will continue to perform such functions until the vehicle has traveled a predetermined distance from the moment in which vehicle enters into the provisional restricted mode.

Again, one factor to consider for allowing the driver to move from the restricted mode to the provisional restricted mode is to account for moments in which the primary driver regains control of the vehicle but forgets his/her PIN to exit from the restricted mode.

If a PIN is not entered, then the method 250 moves to operation 270. If the PIN is entered, then the method 250 moves to operation 272.

In operation 270, the controller 22 locks out various functions. For example, the controller 22 performs operations 134, 136, 138, 140, and 142 (e.g., locks out the eject button for CD player, electronically locks all storage compartments, protects all memory devices, locks out the trunk release, and forces on all safety related features) as noted in connection with FIG. 2B.

In operation 274, the controller 22 removes the vehicle monitoring screen from the display and provides the driver the ability to select and/or operate features associated with the ECM 44.

In operation 276, the controller 22 continues to perform the vehicle monitoring as noted above in connection with operation 260 (without displaying such attributes) and locking out the various vehicle features.

In operation 277, the controller 22 determines whether the primary device has been detected. This operation is similar to operation 264 as noted above. If the primary device has not been detected, then the method 250 moves to operation 278. If so, then the method 250 moves to operation 266.

In operation 278, the controller 22 determines whether the vehicle has been driven over the predetermined distance limit. If the vehicle has not driven past the predetermined distance limit, then the method 250 moves to back to operation 276. If the vehicle has been driven past the predetermined distance limit, then the method 250 moves to operation 266.

In operation 280, the controller 22 exits from the restricted mode and into the fully operational mode where normal driver functionality is provided.

Figure 4:
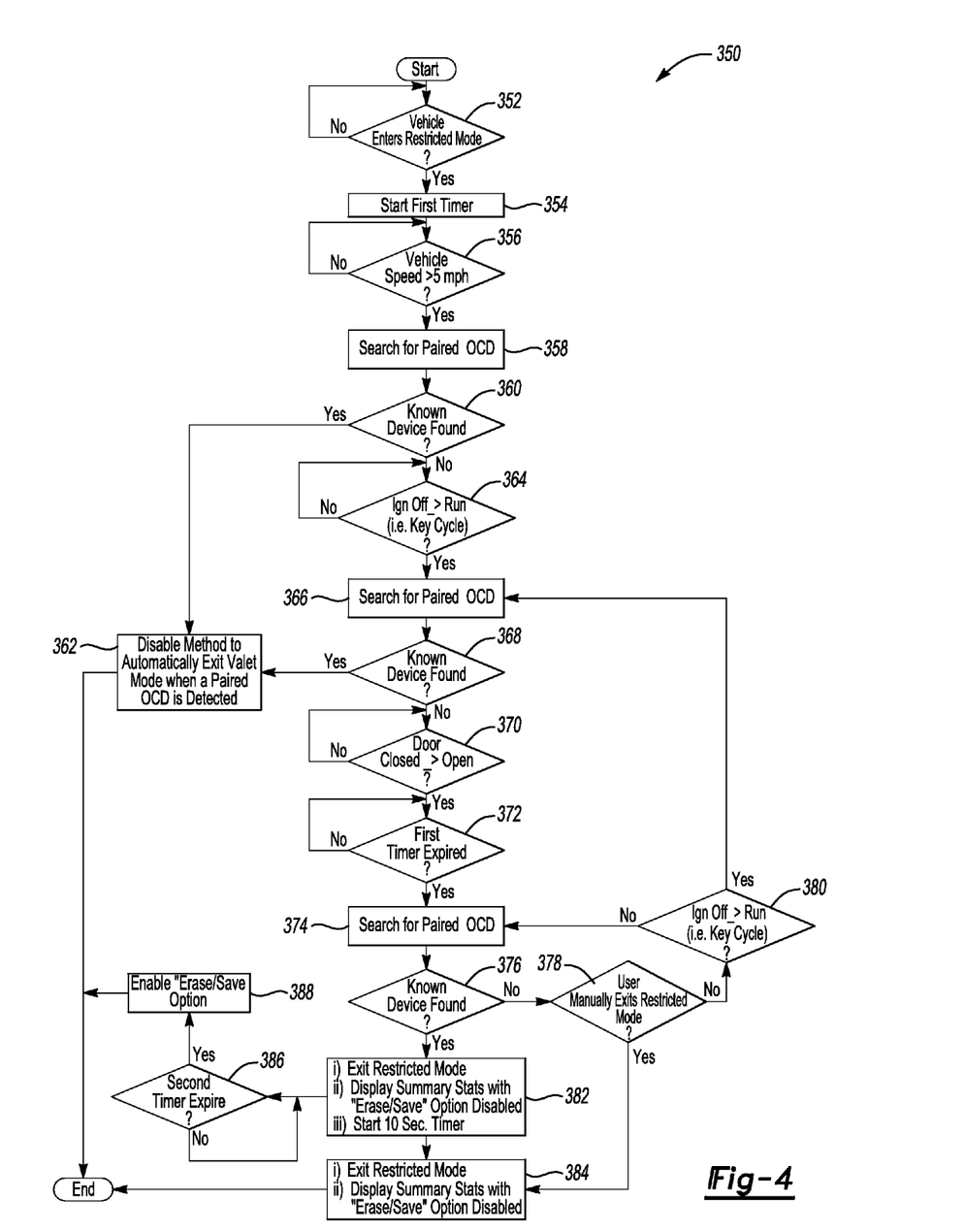
FIG. 4 depicts a method for automatically exiting a restricted mode in accordance to one embodiment of the present invention.

FIG. 4 depicts a method 350 for automatically exiting a restricted mode in accordance to one embodiment of the present invention. The particular order of the operations in the method 350 when performed can be in any order and are not to be limited to only being performed sequentially. The order of the operations may be modified and vary based on the desired criteria of a particular implementation.

In operation 352, a determination is made as to whether the primary driver has placed the vehicle in the restricted mode. The manner in which the primary driver may place the vehicle in the restricted mode is set forth in the operations noted in connection with FIG. 2A. If the controller 22 has determined that the primary driver has placed the vehicle in the restricted mode, then the method 350 moves to 354.

In operation 354, the controller 22 initiates a first timer. The time limit employed by the first timer may be 10 minutes or other suitable time period. The first timer serves to prevent the vehicle from exiting from the restricted mode back to a normal operation mode (or fully operational mode) in the event the OCD 64 belonging to the primary driver is still detected to be in the vehicle after the vehicle has been placed in the restricted mode. For example, as noted above, detection of the OCD 62 (or primary device) may be used as a mechanism to cause the vehicle to exit the restricted mode. However, the implementation of the first timer accounts for the situation in which the primary driver places the vehicle in the restricted mode while the primary driver is still positioned close to the vehicle and the primary driver's OCD 62 is still being detected by the APIM 60. In this case, it is not desirable to disable the restricted mode. It is likely that perhaps the primary driver may be temporarily waiting outside of the vehicle for friends. The first timer serves to provide a buffer for preventing the vehicle from exiting the restricted mode when it is not desired to do so.

In operation 356, the controller 22 determines if the vehicle has exceeded a predetermined speed limit (e.g., 5 mph or other suitable speed). If so, the method 350 moves to operation 358. If not, the method stays in operation 356.

In operation 358, the controller 22 monitors the signal PRI_DEVICE to search for the OCD 64 belonging to the primary driver.

In operation 360, the controller 22 determines if the OCD 64 belonging to the primary driver has been found. If found, then the method 350 moves operation 362. If not, then the method 350 moves to operation 364.

In operation 362, the controller 22 disables the method to automatically exit from the restricted mode back to the fully operational mode (i.e., the controller 22 prevents the vehicle from exiting from the restricted mode back to the fully operational mode). This condition implies that the primary driver accidentally left his/her OCD 62 in the vehicle because the first time is still active and the vehicle has exceeded a predetermined speed (e.g., 5 mph).

In operation 364, the controller 22 monitors the ignition status to determine if the key transition from ignition OFF to RUN. If this condition is true, then the method 350 moves to operation 366. If not, then the method 350 stays in operation 364.

In operation 366, the controller 22 monitors the signal PRI_DEVICE to search for the OCD 64 belonging to the primary driver.

In operation 368, the controller 22 determines if the OCD 64 belonging to the primary driver has been found. If found, then the method 350 moves operation 362. If not, then the method 350 moves to operation 370. With operations 364, 366, and 368, it can be presumed that the primary driver accidentally left his/her OCD 62 in the vehicle.

In operation 370, the controller 22 determines whether the driver door went from closed to open. If this condition is true, then the method 350 moves to operation 372. If not, the method 350 remains in operation 370.

In operation 372, the controller 22 determines whether the first timer as initiated in operation 354 has expired. If this condition is true, then the method 350 moves to operation 374. If not, then the method 350 stays in operation 372. If operations 370, 372, and 376 are true, this condition indicates that the valet driver left the vehicle and the primary driver has entered into the vehicle and is detected to be by the vehicle by means of detecting the primary device in the vehicle.

It is recognized that in the event the controller 22 receives a valid PIN at any time before the first timer expires, that such a condition moves the vehicle from the restricted mode back into the fully operational mode.

In operation 374, the controller 22 monitors the signal PRI_DEVICE to search for the OCD 64 belonging to the primary driver.

In operation 376, the controller 22 determines if the OCD 64 belonging to the primary driver has been found. If found, then the method 350 moves operation 382. If not, then the method 350 moves to operation 378

In operation 378, the controller 22 determines if the driver has manually selected to exit from the restricted mode by way of inputting a valid PIN. If the above condition is true, then the method 350 moves to operation 384. If not, then the method 350 moves to operation 380.

In operation 380, the controller 22 determines whether the ignition switch transitioned from OFF to RUN. If true, then the method 350 moves to operation 366. In not, then the method 350 moves to operation 374.

In general, the transition from operations 374, 376, 378, 380 and back to 374 may represent the condition in which the valet driver may be holding the door open for the primary driver as the primary driver approaches the vehicle.

The transition from 376, 378, 380, and 366 may represent the condition in which the vehicle may have stalled or that the valet driver may have performed an additional drive cycle.

In operation 382, the controller 22 exits the restricted mode, displays the summary stats related to the valet driver (e.g., the distance driven, status of USB and/or SD card, etc.), and starts a second timer. The controller 22 starts a second timer to prevent the valet driver from erasing the stats displayed on the display 24 (recall that the primary device (or OCD 64) is detected and it is possible for the primary driver to not be within the vehicle. A such, it would be possible for the valet driver to erase the stats which depict distance driven and the whether the USB 52 and/or the SD card 54 are present in the vehicle). The second timer may be set to ten seconds or other suitable value.

In operation 386, the controller 22 determines whether the second timer has expired. If this condition is true, then the method 350 moves to operation 388. If not, then the method 350 stays in operation 386.

In operation 388, the controller 22 enables the primary driver the ability to either erase the stats associated with the valet driver or to save the stats associated with the valet driver (e.g., the distance driven, status of USB and/or SD card, etc.).

In operation 384, the controller 22 exits the restricted mode, displays the summary stats associated with the valet driver, and allows the primary driver to erase or save such stats.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention. As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. An apparatus for controlling a restricted mode, the apparatus comprising:
a controller configured to:
receive a first input from a primary driver corresponding to a request to change a vehicle from a fully operational mode to a restricted mode for a secondary driver; and
initiate a first timer for preventing the vehicle from exiting from the restricted mode to the fully operational mode if an occupant communication device belonging to the primary driver is detected by the vehicle prior to the first timer expiring.

2. The apparatus of claim 1 wherein the controller is further configured to change the vehicle from the restricted mode to the fully operational mode if the first timer has elapsed and the occupant communication device belonging to the primary driver is detected by the vehicle.

3. The apparatus of claim 1 wherein the controller is further configured to change the vehicle from the restricted mode to the fully operational mode if a second input indicative of a valid identification code is received prior to the first timer expiring.

4. The apparatus of claim 1 wherein the controller is further configured to monitor vehicle speed and to prevent the vehicle from exiting from the restricted mode to the fully operational mode in the event the (i) first timer has not expired, (ii) occupant communication device belonging to the primary driver is detected by the vehicle, and (iii) vehicle speed has exceeded a predetermined vehicle speed.

5. The apparatus of claim 4 wherein (i) detection of the occupant communication device belonging to the primary driver and (ii) the vehicle speed exceeding the predetermined vehicle speed each of which occurring prior to the first timer expiring are indicative of the primary driver leaving the occupant communication device within the vehicle after moving the vehicle from the fully operational mode to the restricted mode.

6. The apparatus of claim 1 wherein the controller is further configured to monitor ignition status and to prevent the vehicle from exiting from the restricted mode to the fully operational mode in the event the (i) first timer has not expired, (ii) occupant communication device belonging to the primary driver is detected by the vehicle, and (iii) ignition status cycled from an OFF state to a RUN state.

7. The apparatus of claim 6 wherein detection of the occupant communication device belonging to the primary driver and the ignition state cycling from the OFF state to the RUN state prior to the first timer expiring are indicative of the primary driver leaving the occupant communication device within the vehicle after moving the vehicle from the fully operational mode to the restricted mode.

8. The apparatus of claim 1 wherein the controller is further configured to initiate a second timer in the event the first timer has expired and the vehicle moves from the restricted mode to the fully operational mode.

9. The apparatus of claim 8 wherein the controller is further configured to prevent one of the primary driver and the second driver from deleting vehicle statics associated with the second driver prior to the second timer expiring.

10. The apparatus of claim 9 wherein the controller is further configured to allow the primary driver to one of store the vehicle statistics associated with the secondary driver and delete the vehicle statics associated with the second driver after the second timer has expired.

* * * * *